May 31, 1949. W. M. BLEAKNEY ET AL 2,471,857
FLUTTER DAMPER
Filed May 9, 1946 2 Sheets-Sheet 1
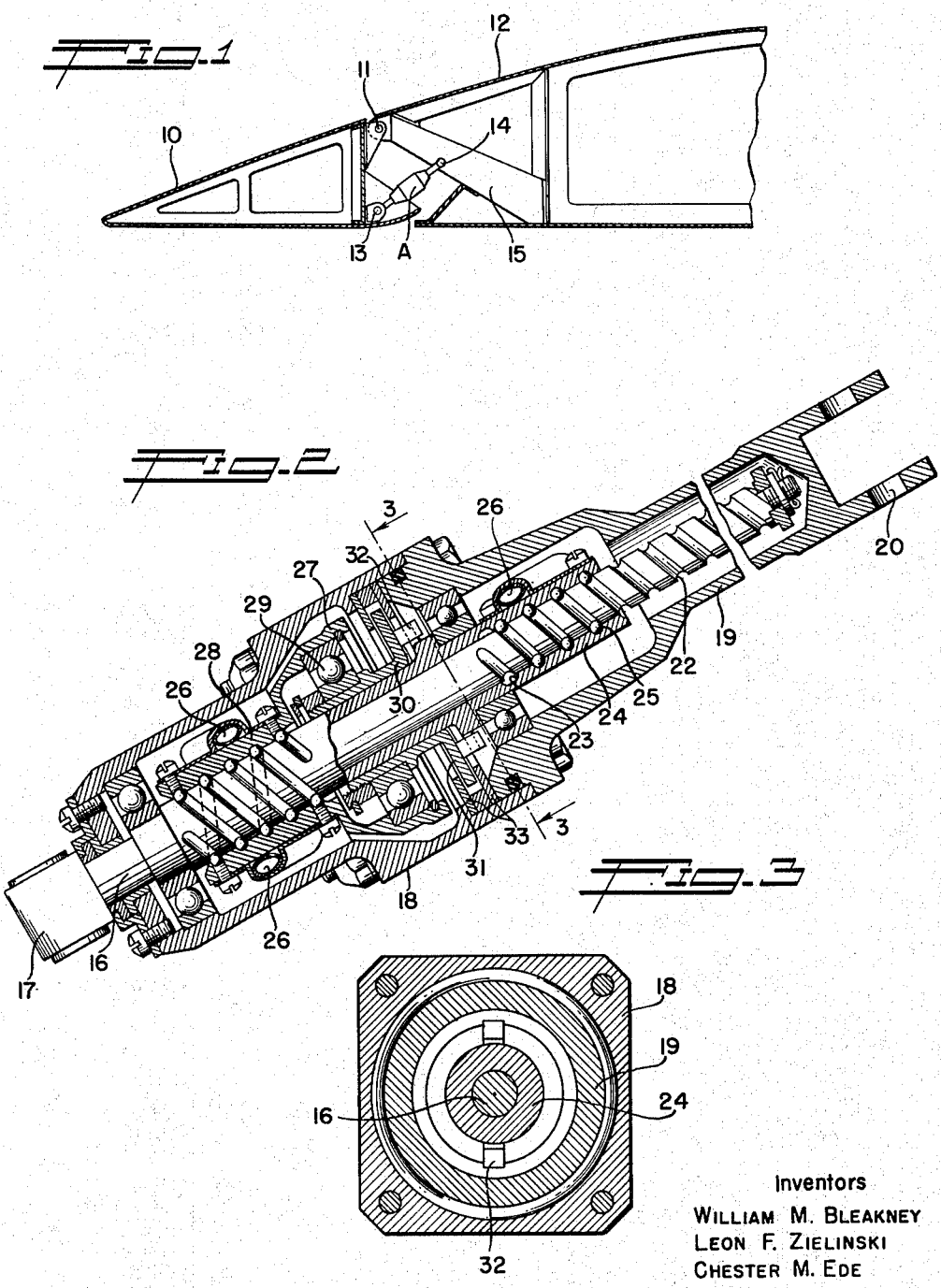
Inventors
WILLIAM M. BLEAKNEY
LEON F. ZIELINSKI
CHESTER M. EDE
BY
George C. Sullivan

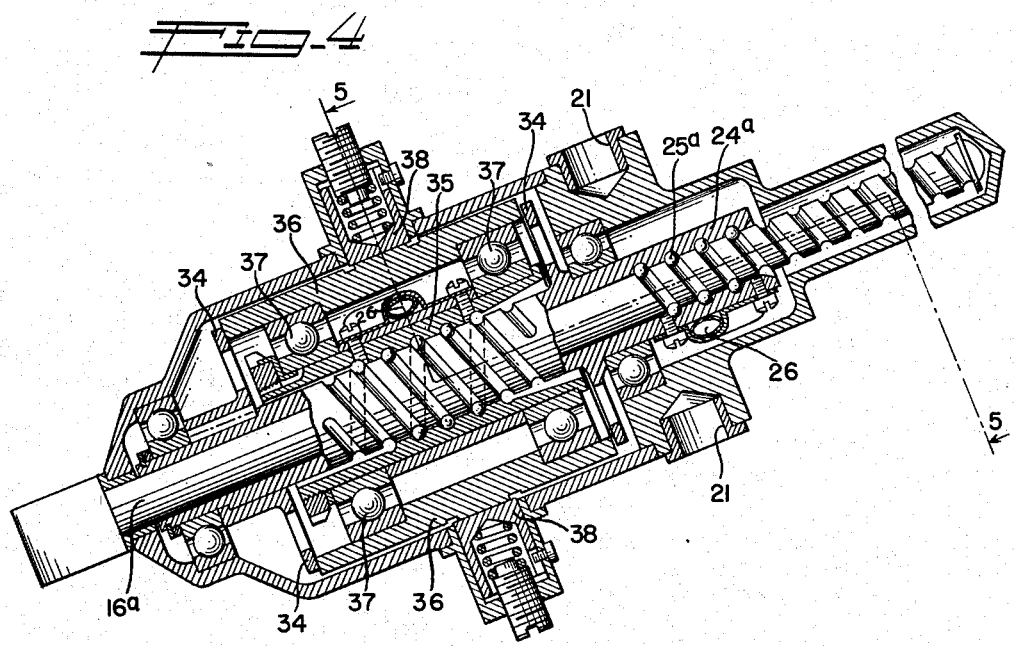
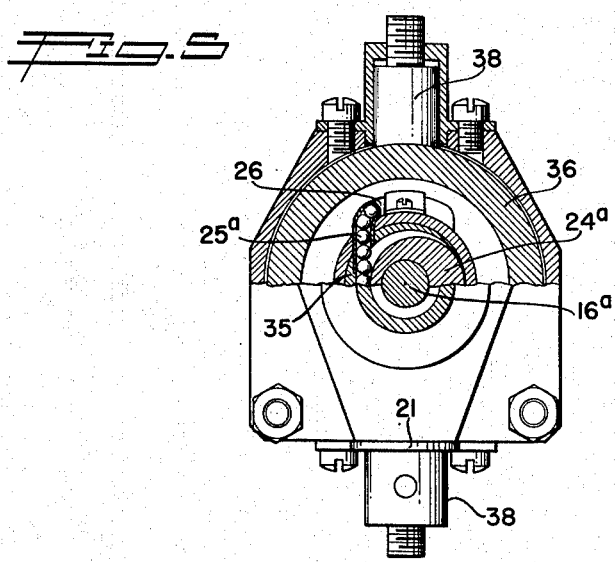

Patented May 31, 1949

2,471,857

UNITED STATES PATENT OFFICE 2,471,857

FLUTTER DAMPER

William M. Bleakney, Leon F. Zielinski, and Chester M. Ede, Burbank, Calif., assignors to Lockheed Aircraft Corporation, Burbank, Calif.

Application May 9, 1946, Serial No. 668,616

12 Claims. (Cl. 188—1)

This invention relates to flutter dampers for aircraft control surfaces. Such control surfaces are subject to dangerous vibratory stresses or flutter at their natural or resonant frequency ranges, which flutter may be excited by mechanical or aerodynamic forces, at certain critical speeds or under critical operating conditions.

In the control or suppression of such flutter tendencies, a braking force or damping capacity, very much less than the energy rates of a given control surface in uncontrolled flutter, is sufficient to suppress or control such flutter. A serious problem to be met in connection with such flutter damping is that such a device must not sensibly inhibit normal flight maneuvers by adding to the control force required, or by introducing a tendency toward over control once a control movement is started.

It is accordingly an object of this invention to provide a flutter damper providing a damping force responsive to accelerations of the associated control surface. To this end we convert axial into high speed rotary motion, and utilize changes in the acceleration of the rotary member to energize a braking device acting directly on the conversion device. In addition to the basic aircraft considerations of weight and compactness we have provided a damper that permits its attached control surface to be used in a quick maneuver without undue pilot effort, and to trail freely in trimmed flight, while being capable of providing damping capacity, substantially independent of environment, sufficient to restore dynamic stability to its attached control surface.

It is a further object of this invention to provide a simple and compact device of the class described wherein linear or axial motion of a draw bar is geared up and converted into high speed rotary motion in a member associated with an inertia member or fly wheel adapted to energize a brake. In order to reduce the size and weight of a given damper, the highest feasible gear ratio is desired, subject to the limitations that internal friction would add to the pilot effort necessary for control surface movement, and that chatter in the braking surfaces as the result of engagement at high speed would produce unpredictably high transient loads upon the damper parts.

It is also an object of this invention to provide an improved flutter damper wherein the only appreciable restriction imposed on control surface maneuverability will be resistance to acceleration, but with no appreciable resistance to deceleration, in order to prevent tendency to overrun or over control. A concomitant result is the absence of drag when the control surface is either stationary or in uniform motion, thus permitting unrestricted feel and trim response, with a minor effect on the time required by the pilot to move the control surface through its full range of travel.

Other objectives and features of the invention will be readily understood from the following detailed description of typical preferred forms of the invention wherein reference will be made to the accompanying drawings in which:

Figure 1 is a fragmentary section through an aileron and the adjacent airplane wing to show the installation of a flutter damper embodying the features of this invention;

Figure 2 is an enlarged longitudinal section through a preferred form of flutter damper embodying the features of this invention;

Figure 3 is a transverse section on the line 3—3 of Figure 2 showing the driving connection between the inertia member and the brake disc;

Figure 4 is a longitudinal section through another form of flutter damper also embodying the features of this invention; and, Figure 5 is an end view, partly in section on the line 5—5 of Figure 4.

As shown on the drawings:

Both illustrated embodiments of this invention relate to the conversion of linear motion into relatively rapid rotation of an inertia member which is used to produce an axial force, proportional to acceleration, to produce a braking action. To illustrate one use of such a damper, a conventional aileron 10 is hinged at 11 to a wing 12, and a flutter damper generally indicated by A has a pivotal connection 13 to the aileron and is also pivoted at 14 to a structural member 15 in the wing 12.

In the preferred form of this invention a draw bar 16 has an eye 17 forming the pivot connection 13 and is reciprocated in a housing 18 by both normal or flutter movement of the aileron, the housing having a rearwardly extending enclosure 19 for the free end of the draw bar, which enclosure also has a yoke 20 for engagement with the pivot 14. In the form of this invention shown in Figure 4, body pivot bearings 21 are provided for attachment to the wing structure, instead of the pivot 14 previously mentioned.

The primary requirements common to the flutter dampers of this invention, beyond basic considerations of weight and compactness, are that the damper must permit its attached control surface to be used in a quick maneuver without undue pilot effort and to be freely reversible, i. e., to trail freely in trimmed flight; also the damper must be absolutely free from any tendency to lock up or jam; and it must provide damping capacity substantially independent of ambient pressures and temperatures and sufficient to restore dynamic stability to its associated control system. It may be noted that the requisite damping capacity is generally very much less than the energy rates of a given control surface in uncontrolled flutter.

In the illustrated embodiments of this invention, the damping force is proportional to the acceleration, so that damping is nominally zero for uniform motion of the control surface, whatever its actual velocity, so that the protection afforded against destructive accelerations (flutter) need not sensibly inhibit normal flight maneuvers. In order to reduce the size and weight of the damper, while retaining adequate mass effect, the linear motion and acceleration received from the control surface by the draw bar 16 is transformed into relatively high speed rotation and high angular acceleration of a small wheel constituting the response or inertia mass.

In order to reduce friction as much as possible, the draw bar 16 is shown as provided with a thread-like ball groove 22 complementing a similar internal groove 23 in a tubular member 24, a plurality of balls 25 in the grooves being recirculated through an external return tube 26. With this arrangement a relatively high speed rotation of the member 24 is caused by linear movement of the draw bar, and the arrangement reduces friction and provides for free reversibility in spite of the relatively high ratio in the transformation of motion. For convenience in what follows, this arrangement will be called a ball bearing nut, the member 24 hereinafter being referred to as the inner nut, as a second member or inertia mass 27, is mounted on the inner nut by a similar recirculating ball bearing 28. In Figure 2 the second member or nut 27 has double recirculation ball channels, corresponding to a double threaded screw, in order to increase the responsiveness of the nut 27 to acceleration forces tending to shift the nut 27 axially at the same time it differentially rotates with the inner nut 24. It will be apparent that the inertia of the nut 27 causes this member to lag behind the accelerated rotation of the inner nut 24, thus causing linear motion of the nut 27.

The outer nut 27 embraces a conventional ball bearing 29 which is used to transmit axial motion of the second nut to a sleeve 30 carrying a brake disc 31. The sleeve 30 is positively driven from the inner nut 24 by lugs 32, but is free for limited axial motion on the inner nut 24. The brake disc 31 is thus pulled or pushed into contact with opposed stationary braking rings 33 clamped in the housing, the nut 27 furnishing the longitudinal or engaging brake force, but being isolated by the ball bearing 29 from the drag of the brake friction, since this drag is carried directly to the inner nut 24 by the lugs 32. Accordingly, the nut 27 responds solely to angular acceleration and produces a braking force in proportion thereto, which braking force is transmitted direct to the inner nut 24.

In the modification of Figures 4 and 5, the draw bar 16a has a recirculating ball bearing connection 25a to the sleeve or inner nut 24a, as previously described, the inner nut 24a in this case being in effect a spool having fixed end discs 34 thereon. A second or outer nut 35 is similarly mounted on a recirculating ball bearing, and in turn has a heavy tubular inertia member 36 mounted thereon on conventional ball bearings 37, the ends of the member 36 having a slight clearance between the discs 34. In this arrangement primary braking friction is developed between either one of the discs 34 and the adjacent end of the member 36 to accelerate the latter. Auxiliary adjustable spring loaded brake shoes 38 bear on the periphery of the member 36 to control its oscillations, increase its initial inertia and to prevent chatter thereof.

In this modification the outer nut 35 responds to accelerations of the inner nut 24a in the same way as the first described form, shifting the heavy inertia member axially into contact with one or the other of the discs 34, to develop braking forces on the inner nut 24a in proportion to the acceleration or changes in angular velocity in response to axial accelerations of the draw bar.

In both forms of this invention the braking effect responds only to accelerations and has no effect on uniform motion, as the braking effect becomes zero at the moment acceleration ceases. The fly wheel or inertia effect is ineffective to continue braking unless acceleration forces are present so that no tendency to overrun or over control arises from the use of dampers embodying this invention. Since the instant accelerated motion stops the force actuating the brake becomes zero, it follows that the full manual force applied to the control surface will become available to overcome any obstruction such as icing of control surfaces or sticking of control or damper parts.

Having thus described our invention and the present preferred embodiments thereof, we desire to emphasize the fact that many modifications may be resorted to in a manner limited only by a just interpretation of the following claims.

We claim as our invention:

1. A flutter damper adapted to suppress natural resonance vibrations in an airplane control surface, comprising an inertia member, means for converting oscillatory movements of said control surface into rotary movements of said inertia member, means adapted to permit substantially friction-free axial movements of said inertia member in response to acceleration of said means, in either direction of rotation and braking means adapted to be engaged by acceleration induced axial movements of said inertia member whereby said flutter damper is adapted to respond only to control surface accelerations imposed on said first mentioned means.

2. A flutter damper adapted to suppress natural resonance vibrations in an airplane control surface, comprising a draw bar linked to the control surface for axial movements in step with the movements of the control surface, a recirculating ball bearing nut for converting axial movements of said draw bar into rotary movements of said nut, an inertia member, means adapted to permit limited axial movements of said inertia member in response to accelerations of said first mentioned recirculating ball bearing nut, and braking means adapted to be engaged by acceleration induced axial movements of said inertia member whereby said flutter damper is adapted to respond only to accelerations.

3. A flutter damper adapted to suppress natural resonance vibrations in an airplane control surface, comprising an inertia member, means for converting oscillatory movements of said control surface into rotary movements of said inertia member, a recirculating ball bearing nut for mounting said inertia member adapted to produce limited axial movements of said inertia member in response to accelerations of said means, and braking means adapted to be engaged by acceleration induced axial movements of said inertia member whereby said flutter damper is adapted to respond only to accelerations.

4. A flutter damper adapted to suppress natural resonance vibrations in an airplane control surface, comprising a draw bar linked to the control surface for axial movements in step with the movements of the control surface, a recirculating ball bearing nut for converting axial movements of said draw bar into rotary movements of said nut, an inertia member, a second recirculating ball bearing nut for mounting said inertia member on said nut adapted to permit limited axial movements of said inertia member in response to accelerations of said first mentioned recirculating ball bearing nut, and braking means adapted to be engaged by acceleration induced axial movements of said inertia member whereby said flutter damper is adapted to respond only to accelerations.

5. A device of the class described comprising a reciprocable draw bar, a rotatable member associated therewith, means for converting reciprocatory motion of the draw bar into rotary motion of said member, a brake mechanism having a movable member in driven engagement with said rotary member, an inertia member mounted on said rotary member and having limited axial and rotary freedom of movement relative thereto, means converting relative rotary motion of the inertia member relative to the rotary member into axial motion of the inertia member, and means associated with said inertia member for shifting the driven member of said braking mechanism into engaging position in said braking mechanism.

6. A device of the class described comprising a reciprocable draw bar, a rotatable member associated therewith, a ball bearing nut for converting reciprocatory motion of the draw bar into rotary motion of said member, a brake mechanism having a movable member in driven engagement with said rotary member, an inertia member mounted on said rotary member and having limited axial and rotary freedom of movement relative thereto, means converting rotary motion of the inertia member relative to the rotary member into axial motion of the inertia member, and means associated with said inertia member for shifting the driven member of said braking mechanism into engaging position in said braking mechanism.

7. A device of the class described comprising a reciprocable draw bar, a rotatable member associated therewith, means for converting reciprocatory motion of the draw bar into rotary motion of said member, a brake mechanism having a movable member in driven engagement with said rotary member, an inertia member mounted on said rotary member and having limited axial and rotary freedom of movement relative thereto, a ball bearing nut adapted to convert relative angular motion of the inertia member relative to the rotary member into axial motion of the inertia member, and means associated with said inertia member for shifting the driven member of said braking mechanism into engaging position in said braking mechanism.

8. A device of the class described comprising a reciprocable draw bar, a rotatable member associated therewith, a ball bearing nut adapted to convert reciprocatory motion of the draw bar into rotary motion of said member, a brake mechanism having a movable member in driven engagement with said rotary member, an inertia member mounted on said rotary member and having limited axial and rotary freedom of movement relative thereto, a second ball bearing nut adapted to convert angular motion of the inertia member relative to the rotary member into axial motion of the inertia member, and means associated with said inertia member for shifting the driven member of said braking mechanism into engaging position in said braking mechanism.

9. A flutter damper comprising a reciprocable draw bar, an intermediate rotary member thereon, mounting means for said member comprising complementary helical grooves in said draw bar and member and balls in said grooves, an inertia member on said intermediate member, mounting means therefor comprising complementary helical grooves in said intermediate member and said inertia member and balls in said grooves, whereby said inertia member is adapted to move axially when subjected to angular accelerations, a brake disc adapted to be driven by said intermediate member, spaced cooperating braking surfaces selectively engageable by said brake disc and means connecting said inertia member to said brake disc adapted to engage said brake disc with one of said brake surfaces upon axial movement of said inertia member.

10. A flutter damper comprising a reciprocable draw bar, an intermediate rotary member thereon, mounting means for said member adapted to convert reciprocatory motion of said draw bar into rotary motion of said intermediate member, an inertia member on said intermediate member, mounting means therefor whereby said inertia member is adapted to move axially when subjected to angular accelerations, a brake disc adapted to be driven by said intermediate member, spaced cooperating braking surfaces selectively engageable by said brake disc and means connecting said inertia member to said brake disc adapted to engage said brake disc with one of said brake surfaces upon axial movement of said inertia member.

11. A flutter damper comprising means adapted to convert flutter movements into rotary motion, a normally disengaged brake disc driven by said rotary motion, braking surfaces therefor, an inertia member, means for mounting said inertia member for differential movements in response to rotary acceleration of said means, and means so constructed and arranged as to engage said brake disc with said braking surfaces upon differential movement of said inertia member.

12. A flutter damper comprising a rotary member, means for driving said rotary member from the source of flutter, an inertia member mounted on said rotary member for differential movement relative thereto, and braking means so constructed and arranged as to impose a braking force on said rotary member upon differential movement of said inertia member.

WILLIAM M. BLEAKNEY.
LEON F. ZIELINSKI.
CHESTER M. EDE.

REFERENCES CITED

The following references are of record in the file of this patent:

UNITED STATES PATENTS

| Number | Name | Date |
| --- | --- | --- |
| 893,680 | Watres | July 21, 1908 |